United States Patent
Lee et al.

(10) Patent No.: US 7,486,373 B2
(45) Date of Patent: Feb. 3, 2009

(54) SUBSTRATE FOR LIQUID CRYSTAL DISPLAY

(75) Inventors: Woo-jae Lee, Yongin-si (KR); Hyung-il Jeon, Incheon-si (KR); Wang-su Hong, Suwon-si (KR); Jong-hyun Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 11/516,945

(22) Filed: Sep. 6, 2006

(65) Prior Publication Data

US 2007/0052670 A1      Mar. 8, 2007

(30) Foreign Application Priority Data

Sep. 6, 2005      (KR) .................. 10-2005-0082838

(51) Int. Cl.
G02F 1/1333      (2006.01)
C09K 19/00      (2006.01)

(52) U.S. Cl. ........................ 349/158; 428/1.5
(58) Field of Classification Search .............. 349/158; 428/1.5
See application file for complete search history.

(56) References Cited

U.S. PATENT DOCUMENTS 7,341,766 B2 *    3/2008   Kishimoto et al. ........... 428/1.6
2002/0022156 A1 *  2/2002   Bright ........................ 428/698
2006/0063015 A1 *  3/2006   McCormick et al. ........ 428/457

FOREIGN PATENT DOCUMENTS

| JP | 03134626    | * 7/1991 |
| JP | 9-318933    | 12/1997 |
| JP | 2001-142057 | 5/2001 |
| KR | 2003-0044793 | 6/2003 |

OTHER PUBLICATIONS

Patent Abstracts of Japan, Publication No. 09-318933, Dec. 12, 1997, 1 p.
Patent Abstracts of Japan, Publication No. 2001-142057, May 25, 2001, 1 p.
Korean Patent Abstracts of Japan, Publication No. 1020030044793, Jun. 9, 2003, 1 p.

* cited by examiner

Primary Examiner—Charlie Peng
(74) Attorney, Agent, or Firm—MacPherson Kwok Chen & Heid, LLP.; David S. Park

(57) ABSTRACT

Provided is a substrate for a liquid crystal display which is resistant to deformation. The substrate includes a flexible substrate, first and second barrier layers respectively disposed on first and second surfaces of the flexible substrate, and first and second hard coating layers respectively disposed on the first and second barrier layers.

18 Claims, 2 Drawing Sheets

SUBSTRATE FOR LIQUID CRYSTAL DISPLAY

This application claims priority from Korean Patent Application No. 10-2005-0082838 filed on Sep. 06, 2005 in the Korean Intellectual Property Office, the disclosure of which is incorporated herein by reference in its entirety.

BACKGROUND OF THE INVENTION

1. Field of the Invention

The present invention relates to a substrate for a liquid crystal display, and more particularly, to a substrate for a liquid crystal display which can be substantially prevented from being deformed.

2. Description of the Related Art

With the recent advancement of technology, the increasing popularity of Internet use and the plethora of information have created ubiquitous display environments in which information is available anytime and anywhere via the Internet. Thus, displays, which are mediators for presentation of information, have begun to play an increasingly important role in the recent information-oriented society, and their application fields have been extended.

To create such ubiquitous display environments, displays must satisfy the following requirements: increased portability, capability of displaying a wide variety of multimedia information, a reduction in weight, a large screen size, high resolution, a high-speed display time, and so on.

To satisfy these requirements, a recent research trend has been to increase a display area and to decrease the density and thickness of a glass substrate constituting a display. However, in reducing the density of a glass substrate used in a display, e.g., a liquid crystal display, there is a technical limitation because physical characteristics of the glass substrate are substantially determined by a silicone dioxide (SiO2) constituting the glass substrate.

In addition, further reducing the size of a display for the purpose of achieving enhanced portability is contrary to consumers' desire for a larger area screen.

In this respect, in order to satisfy both increased portability and a large screen size, there is an increasing need for a flexible display using a plastic substrate. Such a flexible display can be manufactured using a roll-to-roll process. However, to produce the flexible display using a roll-to-roll process, special facilities for application of a plastic substrate must be established in all processes, thereby requiring considerable costs.

While research into flexible displays is currently being conducted by major LCD manufacturers, chucks specially designed for plastic substrates are used in researching the flexible displays. Thus, in order to utilize existing LCD production equipment in manufacturing the flexible displays, substantial modification of the existing production equipment is required.

One approach that has been proposed includes applying a plastic substrate attached to a glass substrate by an adhesive. According to this approach, however, the plastic substrate may undergo a warpage phenomenon due to a difference in the thermal expansion coefficient between the glass substrate and the plastic substrate during the manufacturing process.

In addition, as the thickness of a plastic substrate stacked on a glass substrate increases, the thermal expansion coefficient of the plastic substrate is increased, which makes it more difficult to apply a large screen plastic substrate to the existing LCD production equipment.

Thus, a substrate for a liquid crystal display that advantageously resists warpage while providing larger screen area is highly desirable.

SUMMARY

The present invention provides a substrate for a liquid crystal display, which can be substantially prevented from being deformed.

The above stated object as well as other objects, features, and advantages of the present invention will become clear to those skilled in the art upon review of the following description.

According to an aspect of the present invention, there is provided a substrate for a liquid crystal display, the substrate including a flexible substrate, first and second barrier layers respectively disposed on first and second surfaces of the flexible substrate, the first and second barrier layers having different thicknesses, and first and second hard coating layers respectively disposed on the first and second barrier layers.

According to another aspect of the present invention, there is provided a substrate for a liquid crystal display, the substrate including a flexible substrate, first and second barrier layers respectively disposed on first and second surfaces of the flexible substrate, the first and second barrier layers having different stress strengths, and first and second hard coating layers respectively disposed on the first and second barrier layers.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The above and other features and advantages of the present invention will become more apparent by describing in detail embodiments thereof with reference to the attached drawings in which.

Figure 1:
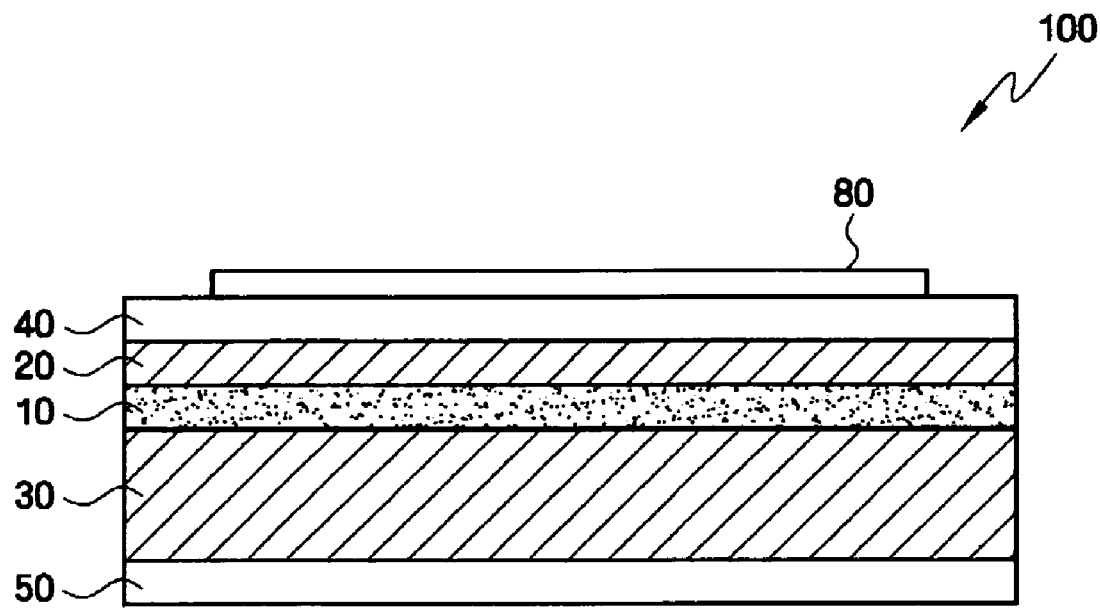
FIG. 1 is a sectional view illustrating a substrate for a liquid crystal display according to an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

Advantages and features of the present invention and methods of accomplishing the same may be understood more readily by reference to the following detailed description of embodiments and the accompanying drawings. The present invention may, however, be embodied in many different forms and should not be construed as being limited to the embodiments set forth herein. Rather, these embodiments are provided so that this disclosure will be thorough and complete and will convey the concept of the invention to those skilled in the art, and the present invention will be defined by the appended claims. Like reference numerals refer to like elements throughout the specification.

The present invention will now be described more fully with reference to the accompanying drawings, in which exemplary embodiments of the invention are shown.

FIG. 1 is a sectional view illustrating a substrate for a liquid crystal display according to an embodiment of the present invention.

Referring to FIG. 1, a substrate 100 for a liquid crystal display includes a flexible substrate 10, first and second barrier layers 20 and 30 respectively disposed on first and second surfaces of the flexible substrate 10, and first and second hard coating layers 40 and 50 respectively disposed on the first and second barrier layers 20 and 30.

In one embodiment, the flexible substrate 10 may be made of a polymer material having mechanical strength. For example, the flexible substrate 10 may be made of one selected from the group consisting of hard polyvinylidenechloride, polyvinylidenechloride, polyetersulphone, polyethylene naphthenate, polyvinylchloride, polystyrene, polycarbonate, polyphenylene oxide, polyallylate, polyester, polyethylene terephthalate, amorphous polyolefin, norbonene-based polymers, polyvinyl alcohol, ethylene-vinyl alcohol copolymers, cellulose, cellulose triacetate, cellulose diacetate, cellulose acetate petitrate, and polyamide imide.

The flexible substrate 10 may have a thickness of about 30 µm to about 500 µm. Here, when the thickness of the flexible substrate 10 is less than about 30 µm or greater than about 500 µm, an advantage of thinness of the flexible substrate 10 may not be realized because the flexible substrate 10 may not properly serve as a substrate when its thickness is less than about 30 µm or greater than about 500 µm.

The first and second barrier layers 20 and 30 are used to prevent the penetration of oxygen, moisture, and chemicals into the flexible substrate 10 during a thin film transistor (TFT) array process or a color filter process. In this embodiment, the first and the second barrier layers 20 and 30 have different thicknesses. The second barrier layer 30 may be thicker than the first barrier layer 20. Here, a thickness ratio of the first and second barrier layers 20 to 30 may be about 1:1.5 to about 1:3. By using such a range of thickness ratio, stress strength between the first barrier layer 20 and the second barrier layer 30 is controlled, and thus, substrate warpage that may be caused after performing a TFT array process on the first barrier layer 20 can be prevented. The first barrier layer 20 may have a thickness of about 50~3,000 Å, and the second barrier layer 30 may have a thickness of about 75~9,000 Å in one example.

During a TFT array process, most films formed on a substrate are inorganic films, and great stress is applied to the substrate. As a result, the physical property of the substrate varies before and after the TFT array process, thereby causing substrate warpage deformation. Thus, when the second barrier layer 30 is thicker than the first barrier layer 20, the substrate deformation after a TFT array process can be prevented.

Each of the first and second barrier layers 20 and 30 may be one selected from the group consisting of an inorganic oxide layer, a nitride layer, an organic layer, an inorganic layer, and a multi-layered stack comprised of an organic layer and an inorganic layer. The inorganic oxide layer may be one selected from the group consisting of SiOx, AlOx, and AlSiOx, and may be formed by sputtering, CVD or PVD. The nitride layer may be SiNx or SiNOx. The organic layer may be acrylate or parylene, and may be formed by an electronic beam, a vacuum evaporation or a spin coating method. The inorganic layer may be a thin metal layer made of, for example, Al. In addition, the multi-layered stack comprised of an organic layer and an inorganic layer may be a stack having two or more layers of an organic layer and an inorganic layer repeatedly laminated.

The first and second hard coating layers 40 and 50 are used to prevent a foreign substance from causing scratches on the first and second barrier layers 20 and 30 during a TFT array process. Furthermore, since the polymer material constituting the flexible substrate 10 decreases the mechanical strength of the flexible substrate 10, the first and second hard coating layers 40 and 50 also serve to increase the mechanical strength of one or both surfaces of the flexible substrate 10. A TFT array 80 may be disposed on the first hard coating layer 40.

Each of the hard coating layers 40 and 50 may be one selected from the group consisting of thermally curable resin, epoxy resin, acryl resin, acryl silicon resin, silicon resin, polyamide imide resin, melamine resin, phenol resin, urethane resin, rubber resin, UV curable resin, and e-beam curable resin. Here, the UV curable resin may comprise UV curable acryl resin, and/or hosphagen resin.

A thickness of each of the hard coating layers 40 and 50 is preferably in a range of about 0.5 µm to about 50 µm. Here, if the thickness of each of the hard coating layers 40 and 50 is less than about 0.5 µm, the hard coating layers 40 and 50 may not properly serve as passivation layers. If the thickness of each of the hard coating layers 40 and 50 is greater than 50 µm, the flexible substrate 10 is made overly thick, so that an advantage of thinness of the flexible substrate 10 cannot be realized.

Figure 2:
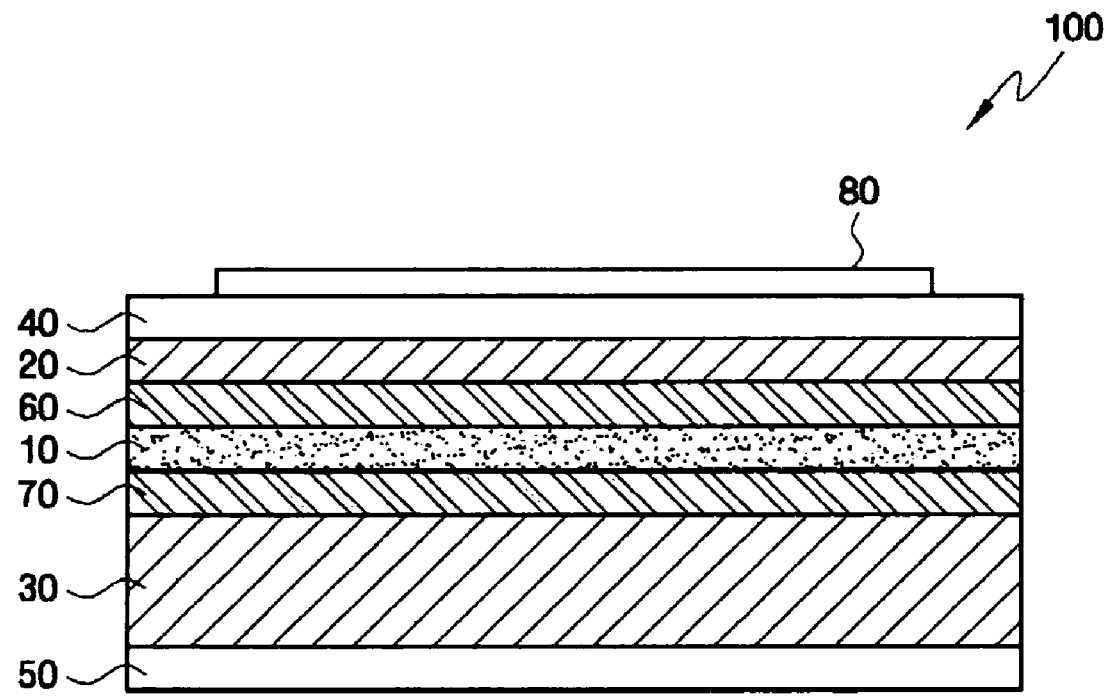
FIG. 2 is a sectional view illustrating a substrate for a liquid crystal display according to another embodiment of the present invention.

FIG. 2 is a sectional view illustrating a substrate for a liquid crystal display according to another embodiment of the present invention.

Referring to FIG. 2, a substrate 100 for a liquid crystal display includes a flexible substrate 10, first and second barrier layers 20 and 30 respectively disposed on both surfaces of the flexible substrate 10 and having different thicknesses, first and second hard coating layers 40 and 50 respectively disposed on the first and second barrier layers 20 and 30, a first adhesive layer 60 interposed between the flexible substrate 10 and the first barrier layer 20, and a second adhesive layer 70 interposed between the flexible substrate 10 and the second barrier layer 30. A TFT array 80 may be disposed on the first hard coating layer 40.

The flexible substrate 10, the first and second barrier layers 20 and 30, and the first and second hard coating layers 40 and 50 are as described in the previous embodiment, and thus, a detailed description thereof will be omitted herein.

The first and second adhesive layers 60 and 70 are formed between the flexible substrate 10 and the first and second barrier layers 20 and 30, respectively. Advantageously, the first and second adhesive layers 60 and 70 may be provided in a case where adhesion between the flexible substrate 10 and each of the first and second barrier layers 20 and 30 is poor.

Each of the adhesive layers 60 and 70 may have a thickness in a range of about 0.2~5 µm. Each of the adhesive layers 60 and 70 may be one selected from the group consisting of thermally curable resin, epoxy resin, acryl resin, acryl silicon resin, silicon resin, polyamide imide resin, melamine resin, phenol resin, urethane resin, rubber resin, UV curable resin, and e-beam curable resin. Here, the UV curable resin may comprise UV curable acryl resin, and/or hosphagen resin.

Figure 3:
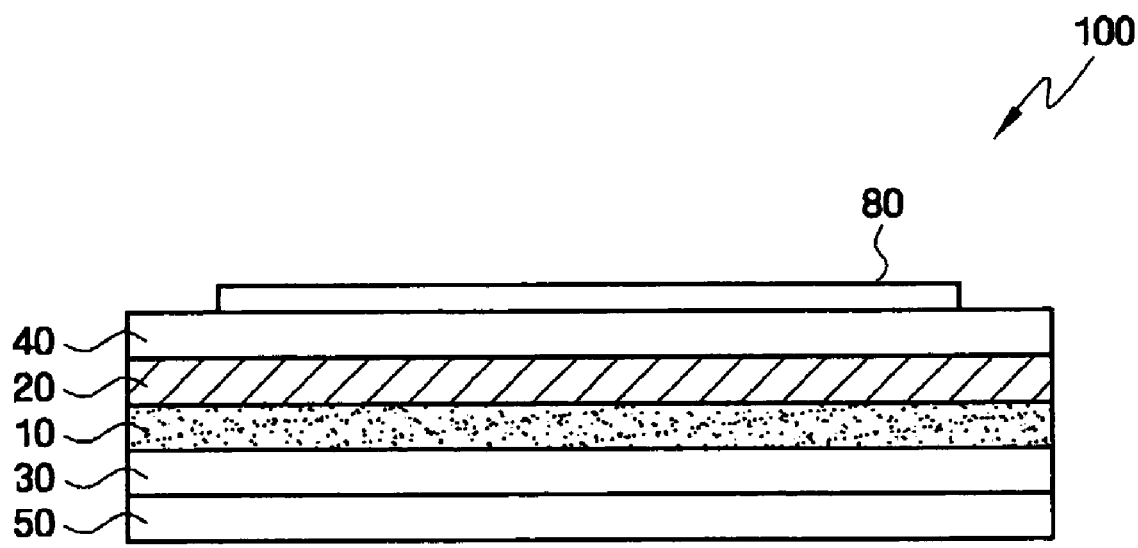
FIG. 3 is a sectional view illustrating a substrate for a liquid crystal display according to still another embodiment of the present invention.

FIG. 3 is a sectional view illustrating a substrate for a liquid crystal display according to still another embodiment of the present invention.

Referring to FIG. 3, the substrate 100 for a liquid crystal display includes a flexible substrate 10, first and second barrier layers 20 and 30 respectively disposed on both surfaces of the flexible substrate 10, and first and second hard coating layers 40 and 50 respectively disposed on the first and second barrier layers 20 and 30.

The flexible substrate 10 may be made of a polymer material having mechanical strength. For example, the flexible substrate 10 may be made of one selected from the group consisting of hard polyvinylidenechloride, polyvinylidenechloride, polyetersulphone, polyethylene naphthenate, polyvinylchloride, polystyrene, polycarbonate, polyphenylene oxide, polyallylate, polyester, polyethylene terephthalate, amorphous polyolefin, norbonene-based polymers, polyvinyl alcohol, ethylene-vinyl alcohol copolymers, cellulose, cellulose triacetate, cellulose diacetate, cellulose acetate petitrate, and polyamide imide.

The flexible substrate 10 may have a thickness of about 30 µm to about 500 µm. Here, when the thickness of the flexible substrate 10 is less than about 30 µm or greater than about 500 µm, an advantage of thinness of the flexible substrate 10 cannot be realized.

The first and second barrier layers 20 and 30 serve to prevent the penetration of oxygen, moisture, or chemicals into the flexible substrate 10 during a TFT array process or a color filter process. Here, the first and second barrier layers 20 and 30 are made of materials having different stress strengths. For example, the first and second barrier layers 20 and 30 may be an inorganic oxide layer and an organic layer, respectively, to have different stress strengths.

During a TFT array process, most films formed on a substrate are inorganic films, and great stress is applied to the substrate. As a result, the physical property of the substrate varies before and after the TFT array process, thereby causing substrate warpage deformation. Thus, when the first and second barrier layers 20 and 30 are made of materials having different stress strengths, the substrate deformation after a TFT array process can be prevented.

Each of the first and second barrier layers 20 and 30 may have a thickness of about 50~3,000 Å, and in this embodiment, layers 20 and 30 have substantially similar thickness but have different stress strengths. Each of the barrier layers 20 and 30 may be one selected from the group consisting of an inorganic oxide layer, a nitride layer, an organic layer, an inorganic layer, and a multi-layered stack comprised of an organic layer and an inorganic layer. The inorganic oxide layer may be formed by sputtering, chemical vapor deposition (CVD), or physical vapor deposition (PVD) using one selected from the group consisting of SiOx, AlOx, and AlSiOx. The nitride layer may be made of SiNx or SiNOx. The organic layer may be formed by e-beam deposition, a vacuum deposition, or spin coating method using acrylate or parylene. The inorganic layer may be formed to a small thickness using a metal such as Al. The inorganic layer maybe a thin metal layer made of, for example, Al. In addition, the multi-layered stack comprised of an organic layer and an inorganic layer may be a stack having two or more layers of an organic layer and an inorganic layer repeatedly laminated.

The first and second barrier layers 20 and 30 may be made of similar materials having different stress strengths. For example, the first barrier layer 20 may be made of inorganic oxide-based SiOx, and the second barrier layer 30 may be made of inorganic oxide-based AlOx. If the stress strength of each layer constituting the substrate 100 is much greater than that of a TFT, the stress of the TFT is negligible.

The first and second barrier layers 20 and 30 may also be made of the same materials having different stress strengths. For example, the first and second barrier layers 20 and 30 may be made of SiOx. Even when the first and second barrier layers 20 and 30 are made of the same material, they can have different stress strengths by controlling the process conditions for the deposition of the first and second barrier layers 20 and 30.

The first and second hard coating layers 40 and 50 are used to prevent a foreign substance from causing scratches on the first and second barrier layers 20 and 30 during a TFT array process. Furthermore, since the polymer material constituting the flexible substrate 10 decreases the mechanical strength of the flexible substrate 10, the first and second hard coating layers 40 and 50 also serve to increase the mechanical strength of one or both surfaces of the flexible substrate 10. A TFT array 80 may be disposed on the first hard coating layer 40.

Each of the hard coating layers 40 and 50 may be one selected from the group consisting of thermally curable resin, epoxy resin, acryl resin, acryl silicon resin, silicon resin, polyamide imide resin, melamine resin, phenol resin, urethane resin, rubber resin, UV curable resin, and e-beam curable resin. Here, the UV curable resin may comprise UV curable acryl resin, and/or hosphagen resin.

A thickness of each of the hard coating layers 40 and 50 is preferably in a range of about 0.5 µm to about 50 µm. If the thickness of each of the hard coating layers 40 and 50 is less than about 0.5 µm, the hard coating layers 40 and 50 may not properly serve as passivation layers. If the thickness of each of the hard coating layers 40 and 50 is greater than about 50 µm, the flexible substrate 10 is made overly thick, so that an advantage of thinness of the flexible substrate 10 cannot be realized.

Figure 4:
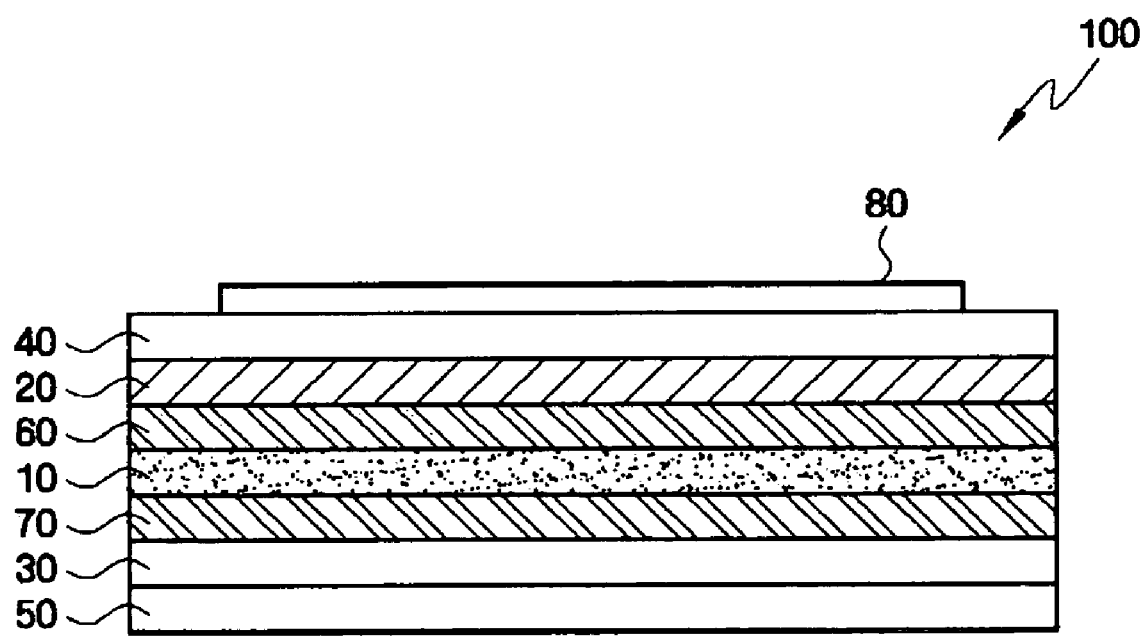
FIG. 4 is a sectional view illustrating a substrate for a liquid crystal display according to yet another embodiment of the present invention.

FIG. 4 is a sectional view illustrating a substrate for a liquid crystal display according to yet another embodiment of the present invention.

Referring to FIG. 4, a substrate 100 for a liquid crystal display includes a flexible substrate 10, first and second barrier layers 20 and 30 respectively disposed on both surfaces of the flexible substrate 10 and having different stress strengths, first and second hard coating layers 40 and 50 respectively disposed on the first and second barrier layers 20 and 30, a first adhesive layer 60 interposed between the flexible substrate 10 and the first barrier layer 20, and a second adhesive layer 70 interposed between the flexible substrate 10 and the second barrier layer 30. A TFT array 80 may be disposed on the first hard coating layer 40.

The flexible substrate 10, the first and second barrier layers 20 and 30, and the first and second hard coating layers 40 and 50 are as described in the embodiment shown in FIG. 3, and thus, a detailed description thereof will be omitted herein.

The first and second adhesive layers 60 and 70 are formed between the flexible substrate 10 and the first and second barrier layers 20 and 30, respectively. Advantageously, the first and second adhesive layers 60 and 70 may be provided in a case where adhesion between the flexible substrate 10 and each of the first and second barrier layers 20 and 30 is poor.

Each of the adhesive layers 60 and 70 may have a thickness in a range of about 0.2~5 µm. Each of the adhesive layers 60 and 70 may be one selected from the group consisting of thermally curable resin, epoxy resin, acryl resin, acryl silicon resin, silicon resin, polyamide imide resin, melamine resin, phenol resin, urethane resin, rubber resin, UV curable resin, and e-beam curable resin. Here, the UV curable resin may comprise UV curable acryl resin, and/or hosphagen resin.

As described above, in a substrate for a liquid crystal display according to the present invention, first and second barrier layers have different thicknesses or are made of materials having different stress strengths. Therefore, the penetration of oxygen, moisture, or chemicals during a TFT array process or a color filter process can be prevented, thereby preventing a substrate deformation after the TFT array process.

In concluding the detailed description, those skilled in the art will appreciate that many variations and modifications can be made to the above-described embodiments without substantially departing from the principles of the present invention. Therefore, the disclosed embodiments of the invention are used in a generic and descriptive sense only and not for purposes of limitation.

What is claimed is:

1. A substrate for a liquid crystal display, the substrate comprising:
   a flexible substrate;
   first and second barrier layers respectively disposed on first and second surfaces of the flexible substrate, the first and second barrier layers having different thicknesses; and
   first and second hard coating layers respectively disposed on the first and second barrier layers.

2. The substrate of claim 1, wherein a thickness ratio of the first barrier layer to the second barrier layer is between about 1:1.5 and about 1:3.

3. The substrate of claim 1, wherein the first barrier layer has a thickness of about 50 Å to about 3,000 Å.

4. The substrate of claim 1, wherein the second barrier layer has a thickness of about 75 Å to about 9,000 Å.

5. The substrate of claim 1, further comprising an adhesive layer between the flexible substrate and each of the first and second barrier layers.

6. The substrate of claim 1, further comprising a thin film transistor array on the first hard coating layer.

7. The substrate of claim 1, wherein each of the first and second barrier layers is one selected from the group consisting of an inorganic oxide layer, a nitride layer, an organic layer, an inorganic layer, and a multi-layered stack comprised of an organic layer and an inorganic layer.

8. The substrate of claim 7, wherein the inorganic oxide layer comprises one selected from the group consisting of SiOx, AlOx, and AlSiOx.

9. The substrate of claim 7, wherein the nitride layer is selected from the group consisting of SiNx and SiNOx.

10. The substrate of claim 7, wherein the organic layer is comprised of a material selected from the group consisting of acrylate and parylene.

11. A substrate for a liquid crystal display, the substrate comprising:
    a flexible substrate;
    first and second barrier layers respectively disposed on first and second surfaces of the flexible substrate, the first and second barrier layers having different stress strengths; and
    first and second hard coating layers respectively disposed on the first and second barrier layers.

12. The substrate of claim 11, further comprising an adhesive layer between the flexible substrate and each of the first and second barrier layers.

13. The substrate of claim 11, further comprising a thin film transistor array on the first hard coating layer.

14. The substrate of claim 11, wherein the first barrier layer has a thickness of about 50 Å to about 3,000 Å.

15. The substrate of claim 11, wherein each of the first and second barrier layers is selected from the group consisting of an inorganic oxide layer, a nitride layer, an organic layer, an inorganic layer, and a multi-layered stack comprised of an organic layer and an inorganic layer.

16. The substrate of claim 15, wherein the inorganic oxide layer comprises one selected from the group consisting of SiOx, AlOx, and AlSiOx.

17. The substrate of claim 15, wherein the nitride layer is selected from the group consisting of SiNx and SiNOx.

18. The substrate of claim 15, wherein the organic layer is selected from the group consisting of acrylate and parylene.

* * * * *